United States Patent
Tsai et al.

(10) Patent No.: US 8,214,666 B2
(45) Date of Patent: Jul. 3, 2012

(54) POWER MANAGING SYSTEM

(75) Inventors: Yu-Chi Tsai, Taipei Hsien (TW);
Kuei-Chih Hou, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 441 days.

(21) Appl. No.: 12/547,497

(22) Filed: Aug. 26, 2009

(65) Prior Publication Data

US 2011/0029789 A1  Feb. 3, 2011

(30) Foreign Application Priority Data

Jul. 29, 2009  (CN) .......................... 2009 1 0304949

(51) Int. Cl.
*G06F 1/00* (2006.01)
*G06F 1/26* (2006.01)
*G06F 11/30* (2006.01)
(52) U.S. Cl. .................. 713/300; 713/320; 713/340
(58) Field of Classification Search .................... 713/300
See application file for complete search history.

(56) References Cited

U.S. PATENT DOCUMENTS

| | | | | |
|---|---|---|---|---|
| 6,225,708 | B1 * | 5/2001 | Furukawa et al. | 307/66 |
| 6,542,997 | B1 * | 4/2003 | Rolls et al. | 713/324 |
| 7,317,265 | B2 * | 1/2008 | Chian et al. | 307/151 |
| 7,442,076 | B2 * | 10/2008 | Huang | 439/502 |
| 7,590,878 | B2 * | 9/2009 | Ren | 713/340 |
| 7,984,312 | B2 * | 7/2011 | Begun et al. | 713/320 |
| 8,050,061 | B2 * | 11/2011 | Tai et al. | 363/40 |
| 2009/0167318 | A1 * | 7/2009 | Xiong | 324/555 |
| 2010/0017628 | A1 * | 1/2010 | Chen et al. | 713/300 |
| 2010/0026265 | A1 * | 2/2010 | Kuno et al. | 323/284 |
| 2010/0235652 | A1 * | 9/2010 | Wilson et al. | 713/300 |

* cited by examiner

*Primary Examiner* — Suresh Suryawanshi
(74) *Attorney, Agent, or Firm* — Altis Law Group, Inc.

(57) ABSTRACT

A power managing system includes a power supply, a first converter, a second converter, and a complex programmable logic device. The power supply outputs a first verification signal and a first power upon the condition that the power supply receives a power supply on signal from a motherboard. The first and second converters convert the first power to a second power, a third power, and output a second verification signal, a third verification signal respectively. The complex programmable logic device outputs an enable signal to the motherboard to make the motherboard receive the first, the second, and the third powers upon the condition that the complex programmable logic device receives the first, the second, and the third verification signals.

9 Claims, 1 Drawing Sheet

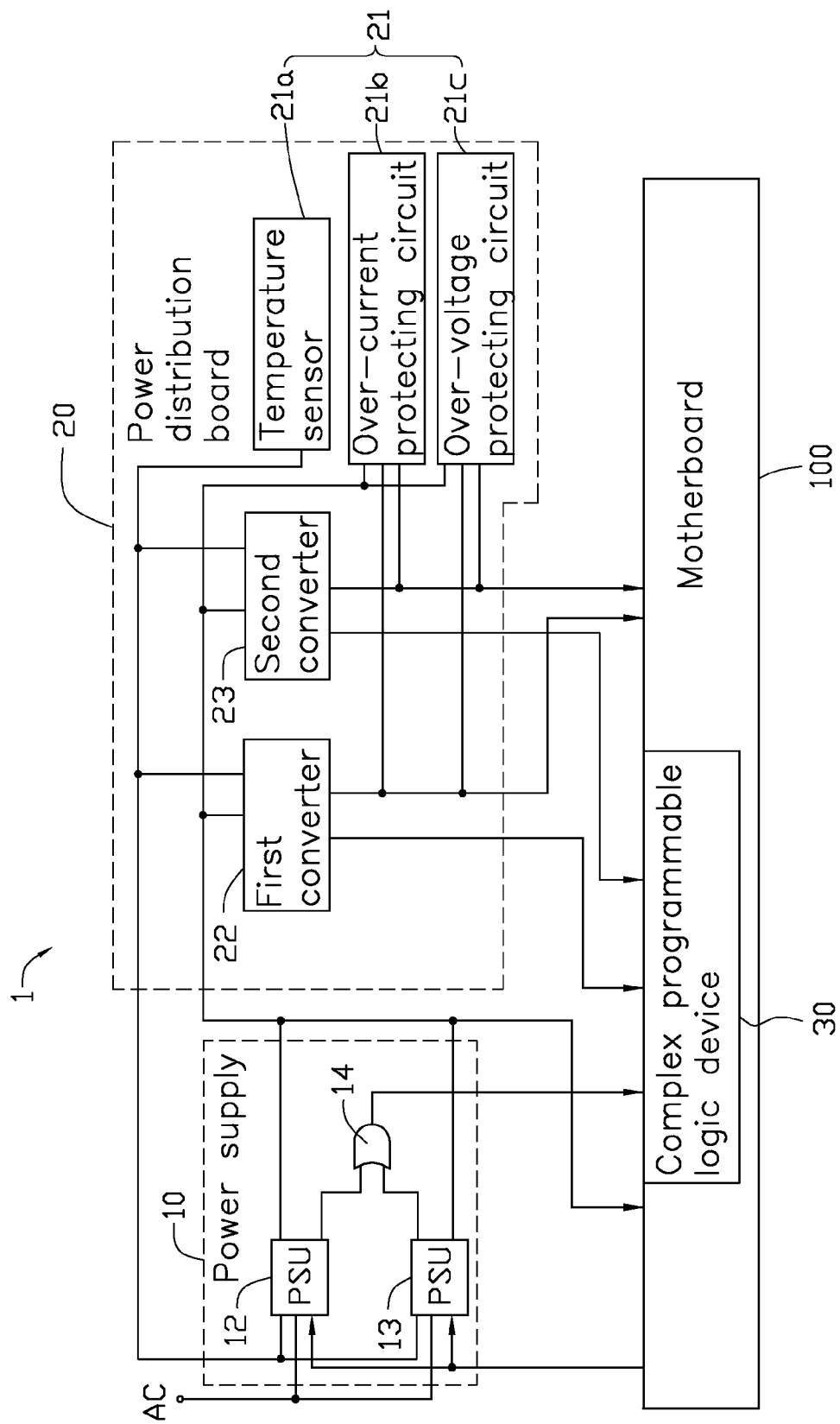

POWER MANAGING SYSTEM

BACKGROUND

1. Technical Field

The present disclosure relates to a power managing system.

2. Description of Related Art

Nowadays, a power managing system for a computer system includes a micro-controller. When a motherboard of the computer system receives a verification signal, it would receive the power from power supply units. In the power managing system, the micro-controller provides the verification signal for the motherboard. As a result, a micro-controller is a necessary part in the power managing system. However, a micro-controller is expensive.

BRIEF DESCRIPTION OF THE DRAWINGS

The figure is a schematic diagram of an exemplary embodiment of a power managing system.

DETAILED DESCRIPTION

Referring to the figure, an exemplary embodiment of a power managing system 1 is operable to supply power to a motherboard 100 of a computer system. The power managing system 1 includes a power supply 10, a power distribution board 20, and a complex programmable logic device 30.

The power supply 10 includes a first power supply unit (PSU) 12, a second PSU 13, and an OR gate 14. First terminals of the first PSU 12 and the second PSU 13 are connected to an external alternating current (AC) power supply to convert an AC power to a +12 volts direct current (DC) power. Second terminals of the first PSU 12 and the second PSU 13 are connected to the motherboard 100 to receive a power supply on (PS_ON) signal from the motherboard 100. Third terminals of the first PSU 12 and the second PSU 13 are connected to an input of the OR gate 14. An output of the OR gate 14 is connected to the complex programmable logic device 30.

The power distribution board 20 includes a discrete circuit 21, a first converter 22 to convert the +12 volts DC power to a +3.3 volts DC power, and a second converter 23 to convert the +12 volts DC power to a +5 volts DC power. The discrete circuit 21 includes a temperature sensor 21a, an over-current protecting circuit 21b, and an over-voltage protecting circuit 21c.

Fourth terminals of the first PSU 12 and the second PSU 13 are connected to inputs of the first converter 22, the second converter 23, and the motherboard 100. Outputs of the first converter 22 and the second converter 23 are connected to the motherboard 100, the over-current protecting circuit 21b, and the over-voltage protecting circuit 21c. The over-current protecting circuit 21b and the over-voltage protecting circuit 21c are also connected to the fourth terminals of the first PSU 12 and the second PSU 13. The temperature sensor 21a is connected to fifth terminals of the first PSU 12 and the second PSU 13, and enable terminals of the first converter 22 and the second converter 23.

When a start button of the computer system is pressed, the motherboard 100 sends the PS_ON signal to the second terminals of the first PSU 12 and the second PSU 13 of the power supply 10. The first PSU 12 and the second PSU 13 output the +12 volts DC power to the motherboard 100, the first converter 22, and the second converter 23, via the fourth terminals of the first PSU 12 and the second PSU 13. In addition, the first PSU 12 sends a verification signal PS_OK1 to the OR gate 14 to denote that the first PSU 12 operates normally. The second power supply unit 13 sends a verification signal PS_OK2 to the OR gate 14 to denote that the second PSU 13 operates normally.

The OR gate 14 processes the verification signals PS_OK1 and PS_OK2. Due to the OR gate 14, as long as one of the first PSU 12 and the second PSU 13 operates normally, the OR gate 14 will output a verification signal PS_OK. The verification signal PS_OK is transmitted to the complex programmable logic device 30 to denote that the first PSU 12 or the second PSU 13 has received the PS_ON signal and converted the AC power to the +12 volts DC power.

The first converter 22 converts the +12 volts DC power to the +3.3 volts DC power after the first converter 22 receives the +12 volts DC power, and outputs a verification signal 3.3V_PG to the complex programmable logic device 30 to denote that the first converter 22 operates normally. The second converter 23 converts the +12 volts DC power to a +5 volts DC power after the second converter 23 receives the +12 volts DC power, and outputs a verification signal 5V_PG to the complex programmable logic device 30 to denote that the second converter 23 operates normally.

The complex programmable logic device 30 outputs a verification signal to the motherboard 100 when the complex programmable logic device 30 receives the verification signals PS_OK, 3.3V_PG, and 5V_PG. In addition, the motherboard 100 receives the +12 volts DC power, the +3.3 volts DC power, and the +5 volts DC power to start the computer system when receiving the enable signal.

In other embodiments, the OR gate 14 can be omitted. The verification signals PS_OK1 and PS_OK2 are transmitted to the complex programmable logic device 30. The complex programmable logic device 30 outputs the enable signal to the motherboard 100 when the complex programmable logic device 30 receives the verification signals PS_OK1, 3.3V PG, and 5V PG, or the verification signals PS_OK2, 3.3V PG, and 5V_PG.

The temperature sensor 21a measures the temperature of the power managing system 1. Upon the condition that the temperature of the power managing system 1 is greater than a predetermined temperature, the temperature sensor 21a outputs a first warning signal to the first PSU 12 and the second PSU 13 to signal the first PSU 12 and the second PSU 13 to discontinue outputting the verification signals PS_OK1 and PS_OK2, and to the first converter 22 and the second converter 23 to discontinue outputting the verification signals 3.3V_PG and 5V_PG As a result, the motherboard 100 will not receive the +12 volts DC power, the +3.3 volts DC power, and the +5 volts DC power. As a result the computer system is protected from destroyed.

The over-current protecting circuit 21b measures the current flowing from the first PSU 12 and the second PSU 13. Upon the condition that the current is greater than a predetermined current correspondingly, the over-current protecting circuit 21b outputs a second warning signal to the first PSU 12 and the second PSU 13 to discontinue outputting the verification signals PS_OK1 and PS_OK2, and to the first converter 22 and the second converter 23 to discontinue outputting the verification signals 3.3V_PG and 5V_PG As a result, the motherboard 100 will not receive the +12 volts DC power, the +3.3 volts DC power, and the +5 volts DC power. As a result, the computer system is protected from destroyed.

The over-voltage protecting circuit 21c measures the voltage at the first PSU 12 and the second PSU 13. Upon the condition that the voltage is greater than a predetermined voltage correspondingly, the over-voltage protecting circuit 21c outputs a third warning signal to the first PSU 12, the second PSU 13, the first converter 22, and the second converters 23. As a result, the computer system is protected from destroyed. It can be understood that the over-current protecting circuit 21*b* and the over-voltage protecting circuit 21*c* are well known circuits.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A power managing system comprising:
    a power supply to output a first verification signal and a first power upon the condition that the power supply receives a power supply on (PS_ON) signal from a motherboard;
    a power distribution board comprising:
        a first converter to convert the first power to a second power and to output a second verification signal; and
        a second converter to convert the first power to a third power and to output a third verification signal; and
    a complex programmable logic device to output an enable signal to the motherboard to make the motherboard receive the first, the second, and the third powers upon the condition that the complex programmable logic device receives the first, the second, and the third verification signals.

2. The power managing system of claim 1, wherein the power supply comprises a plurality of power supply units, each of the plurality of power supply units outputs the first verification signal to the complex programmable logic device.

3. The power managing system of claim 2, wherein the power supply comprises an OR gate, the OR gate is coupled between each of the plurality of power supply units and the complex programmable logic device.

4. The power managing system of claim 1, wherein the first power is a +12 volts direct current power.

5. The power managing system of claim 1, wherein the first converter is a +3.3 volts converter, the second power is +3.3 volts direct current power.

6. The power managing system of claim 1, wherein the second converter is a +5 volts converter, the second power is +5 volts direct current power.

7. The power managing system of claim 1, wherein the power distribution board comprises a temperature sensor to measure temperature of the power managing system, upon the condition that the temperature of the power managing system is greater than a predetermined temperature, the temperature sensor outputs a warning signal to the power supply, the first converter, and the second converter to protect the motherboard.

8. The power managing system of claim 1, wherein the power distribution board comprises an over-current protecting circuit to measure a current flowing from the power supply, upon the condition that the current of the power supply is greater than a predetermined current correspondingly, the over-current protecting circuit outputs a warning signal to the power supply, the first converter, and the second converter to protect the motherboard.

9. The power managing system of claim 1, wherein the power distribution board comprises an over-voltage protecting circuit to measure a voltage at the power supply, upon the condition that the voltage of the power supply is greater than a predetermined voltage correspondingly, the over-voltage protecting circuit outputs a warning signal to the power supply, the first converter, and the second converter to protect the motherboard.

\* \* \* \* \*